Jan. 25, 1955    AN WANG    2,700,501
VOLTAGE DETECTOR
Filed Dec. 28, 1951    2 Sheets-Sheet 1

INVENTOR.
AN WANG
BY Edgar H. Kent

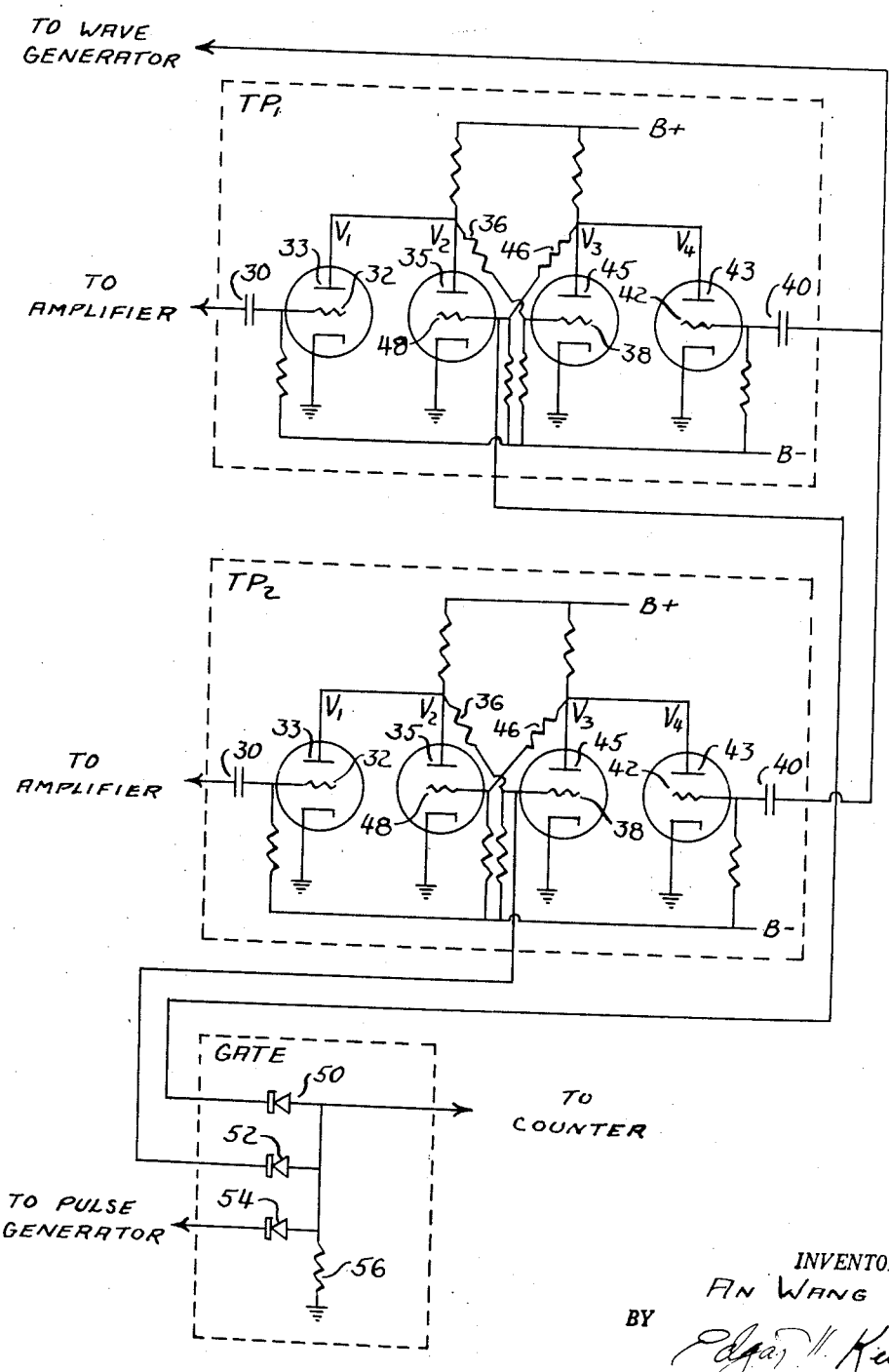

United States Patent Office 2,700,501
Patented Jan. 25, 1955

2,700,501

VOLTAGE DETECTOR

An Wang, Cambridge, Mass.

Application December 28, 1951, Serial No. 263,895

3 Claims. (Cl. 235—6)

This invention relates to voltage detection and more particularly to a novel voltage detector adapted to digitalize a voltage reading so that it may be either recorded for later reading out or fed directly to an electrical computing mechanism.

The well-known types of electrical computing mechanisms, for example, are arranged to be operated by feeding into them suitable digital numbers, that is, numbers having some maximum quantity of significant figures as determined by the characteristics of the particular computing mechanism. In cases in which the information to be fed to the computing mechanism is not in the form of a suitable digital number, the common practice is for an operator to decide on the closest digital number to that representing the information, and then feed such closest digital number to the computing mechanism. Thus, if the information to be fed to the computing mechanism is represented by an unknown voltage, an operator first reads the unknown voltage on a voltmeter, next converts his reading to a suitable digital number, and finally feeds the digital number into the computing mechanism.

In the large number of instances in which the information to be fed to the computing mechanism either directly or through a recording medium is provided in the form of an unknown voltage by electronic devices, for example, devices arranged to provide pressure or temperature readings at frequent short intervals, it has heretofore been impossible to coordinate the computing mechanism with such devices since it was necessary to provide an operator to digitalize the information before it could be fed to the computing mechanism. The necessity for an operator, besides being expensive and inconvenient, under many circumstances provided such slow speed operation as to render the use of computing mechanisms substantially impractical, and further prevented the use of such mechanisms in many places in which the use of an operator was impossible.

Accordingly, it is the purpose of the present invention to provide a novel digital voltmeter having a novel voltage detector and capable of digitalizing an unknown voltage to enable both the recording of digital voltage readings for later use or the direct feeding of a computing mechanism by such voltage.

It is a feature of my novel voltmeter that by its use the intervention of an operator is unnecessary for normal operation, hence greatly speeding up the operation of such devices, as well as making possible the use of such devices in places not heretofore possible.

For the purpose of more fully describing a preferred embodiment of my invention, reference is made to the following drawings, in which:

Fig. 3 is a circuit diagram of suitable trigger pair and gate circuits for use in the digital voltmeter of my invention.

Figure 1:
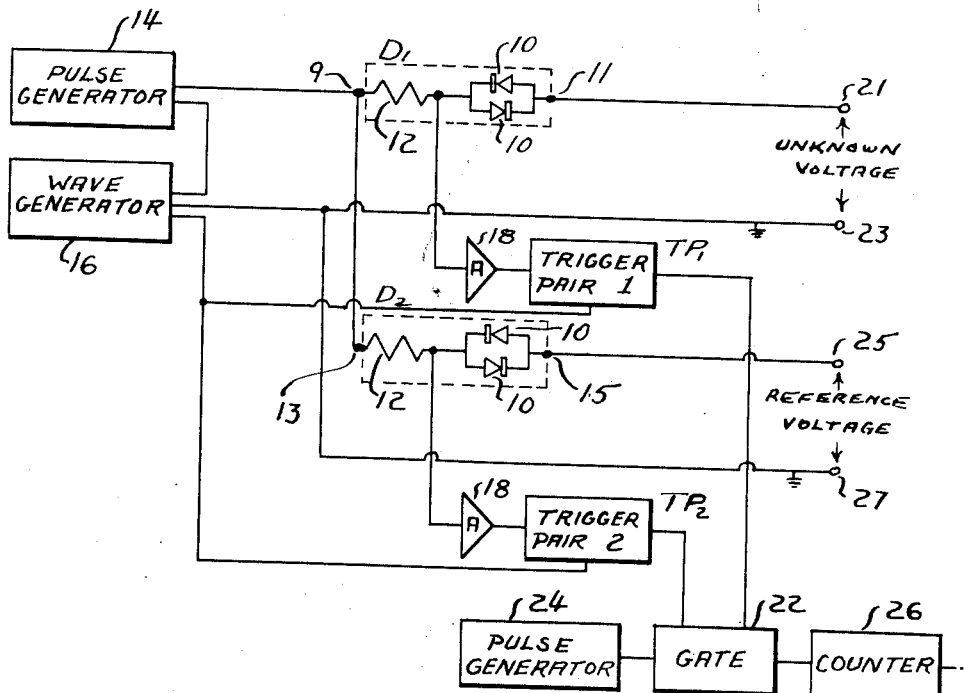
Fig. 1 is a schematic circuit diagram of the digital voltmeter of my invention.

The novel digital voltmeter of my invention involves the use of a novel voltage sensitive element as a detector to compare an unknown voltage with a known voltage. The voltage sensitive detector comprises two non-linear rectifying elements 10 in parallel with their easy conducting directions opposite, such elements, for example, being semi-conductors, such as germanium or silicon; copper oxide or selenium rectifiers; or vacuum tubes having a non-linear characteristic particularly at low voltage. The detector comprising such elements 10 has increasing sensitivity as the voltage across its two terminals 9 and 11 approaches zero, that is, its resistance is quite low except when there is a very small or zero voltage difference between its terminals. Thus, there is a peak on the dynamic resistance curve of such detector when the voltage difference between its terminals is zero. I employ a common limiting resistor 12 or other impedance, such as the internal impedance of a pulse source, in series with said elements 10, since such an impedance permits the measurement of the voltage across the parallel elements 10 of the detector. Also, with the resistor 12, the voltage across terminals 9 and 11 may vary considerably without causing damage to the rectifier elements 10.

In order to utilize the dynamic resistance characteristic of such voltage detector, I provide a pulse generator 14 connected across terminals 9 and 11 to supply a high frequency pulsating, detecting signal to the detector as a load, the detecting signal being of any convenient frequency, say 50 kilocycles per second. Such a signal, due to the dynamic resistance characteristic of the detector, will produce an amplitude peak when the voltage difference between the two terminals 9 and 11 of the detector is zero, as it will appear across the then relatively high resistance of the detector elements 10 in parallel. The peak of voltage rise of the alternating detecting signal as provided by pulse generator 14 can then be used to determine the point at which the voltage across the detector is zero.

The voltage sensitive detector as above described may be utilized to digitalize an unknown voltage by applying to the detector, in addition to the pulsating detecting signal, an unknown voltage at one terminal 11 of the detector and an accurately known series of digital comparison voltages to the other terminal 9 of the detector, the unknown voltage and the known voltage in effect being in series opposing across the detector. By comparing the series of known digital voltages with the unknown voltage until the detector indicates a peak of the detecting signal, at which time the two voltages are equal and opposite and their sum is thus zero, one of the known digital voltages nearest to the value of the unknown voltage may be determined, thus digitalizing the unknown voltage. The known digital voltage series can be supplied by a number of means, such as by using an accurate rotary switching system or a generated wave of any known regular shape and frequency, but I prefer to use an accurate sine wave of known frequency and amplitude provided by wave generator 16.

The digital voltmeter of my invention, then, as best shown in Fig. 1, comprises two similar voltage sensitive detectors as above described, detector $D_1$ and detector $D_2$, said detectors preferably having a common source of pulsating detecting signal—pulse generator 14, and a common source of digital comparison voltages, wave generator 16—both of said generators being in series and connected across the terminals 9 and 11 and 13 and 15 of detectors $D_1$ and $D_2$ respectively to provide pulses superimposed on a sine wave. The unknown voltage, that is, the voltage to be digitalized for recording or for feeding directly to a computing mechanism is connected at terminals 21 and 23, in series with said wave generator and pulse generator across the terminals 9 and 11 of detector $D_1$. Thus, since the wave generator 16 supplying the known comparison voltage and the terminals 21 and 23 connected to the unknown voltage have a common connection, preferably grounded, the comparison voltage may be considered as connected to terminal 9 and the unknown voltage to terminal 11 of detector $D_1$, the two voltages thus being in series across the parallel elements 10. In order to determine the amplitude peak of the detecting signal, a voltage amplifier 18 of any well known type suitable for amplifying a pulsating detecting signal appearing across the voltage sensitive elements 10 is connected to the circuit of detector $D_1$ at the junction of resistor 12 and rectifying elements 10. The detecting signal as fed to amplifier 18 thus is the pulsating voltage appearing across the parallelled elements 10 alone, the junction of resistor 12 and elements 10 being isolated from other circuit elements such as the generator 16 as well as the unknown voltage. Amplifier 18 is connected to a suitable ground as is one side of wave generator 14 and the unknown voltage. The voltage amplifier 18 is connected to a first trigger pair $TP_1$ for providing a voltage change corresponding to a point on the peak of the detecting signal appearing across the elements 10 of detector $D_1$.

The detector $D_2$ has a pair of terminals 25 and 27 in series with the common pulse generator 14 and wave generator 16, said terminals being connected to a source of known reference voltage, preferably zero voltage as by shorting terminals 25 and 27. Thus, as above described in connection with detector $D_1$, detector $D_2$ has at one terminal 13 thereof the comparison voltage provided by wave generator 16 and at the other terminal 15 thereof the zero reference voltage connected across terminals 25 and 27, the common side of wave generator 16 and the reference voltage preferably being grounded. The detecting signal peak produced when the comparison voltage is equal to zero reference voltage is taken from the detector $D_2$ at the junction of resistor 12 and rectifiers 10, is amplified by a suitable amplifier 18, and fed to a second trigger pair $TP_2$ for providing a voltage change corresponding to a point on the peak of the detecting signal appearing across the elements 10 of detector $D_2$.

The trigger pairs $TP_1$ and $TP_2$ are adapted to be cyclically reset by a signal—either directly as shown or through a pulse sharpening circuit—from wave generator 16 and are each connected to a gate 22 for controlling the flow of pulses provided by a pulse generator 24 to a counter 26 all as hereinafter more fully explained.

A suitable circuit for trigger pairs $TP_1$ and $TP_2$, and their connections to gate 22 is shown in Fig. 3, each of such trigger pairs being actuated both by the detecting signal amplitude peak from amplifier 18 to set the trigger pair and by the sine wave pulses either directly from wave generator 16 or from wave generator 16 through any of the well known pulse generating or sharpening circuits, to reset the trigger pair to its initial condition in readiness for the next reading. The detecting signal voltage from amplifier 18 is fed, through capacitor 30, to the grid 32 of a triode $V_1$, the plate 33 of which is connected to the plate 35 of triode $V_2$, and, through a resistor 36, to the grid 38 of triode $V_3$. The reset sine wave pulses from wave generator 16 either directly or as pulses controlled by generator 16 are fed through capacitor 40 to the grid 42 of triode $V_4$, the plate 43 of which is connected to the plate 45 of triode $V_3$, and, through a resistor 46, to the grid 48 of triode $V_2$. Suitable D. C. plate voltage is supplied to the plates of all said triodes, and suitable negative grid voltage to all the grids thereof, the cathodes of all of said triodes being grounded. The output voltage from said trigger pair $TP_1$ is preferably taken directly from the grid 48 of triode $V_3$, such voltage being either low or high, depending upon the condition of the trigger pair. Thus, when a positive setting pulse from amplifier 18 arrives at the grid 32 of triode $V_1$, said triode becomes conducting, reducing the plate voltage of both triode $V_1$ and $V_2$, and the grid voltage of triode $V_3$. Triode $V_3$ then becomes non-conducting and the plate voltage of triode $V_3$ and $V_4$ rises, as does the grid voltage of triode $V_2$ to keep triode $V_2$ conducting after the setting pulse is gone. A high voltage level is thus maintained at grid 48 of triode $V_2$ for controlling gate 24.

The reset pulse from wave generator 16 acts similarly on triodes $V_4$, $V_3$ and $V_2$, reducing the potential at plates 43 and 45 of triodes $V_4$ and $V_3$, respectively, and at grid 43 of triode $V_2$ to make triode $V_2$ non-conducting. The voltage at plates 35 and 33 of triodes $V_2$ and $V_1$ thus increases, producing a higher voltage at the grid 38 of triode $V_3$ which remains conducting after the reset pulse is gone. The gate controlling voltage at grid 48 then falls to its lower value. As is well known in this art, the trigger pair may be triggered from any convenient point in the amplitude of the voltage rise of the detecting signal, either at the peak or somewhat before, the latter being preferable in most instances.

The circuit of trigger pair $TP_2$ is identical to that of $TP_1$, with the exception that the output voltage change is taken from the grid 38 of $V_3$, thus giving an output voltage of opposite polarity and equal to that of $TP_1$ under either triggered or reset condition. The trigger pair $TP_2$ should be triggered from the same relative position in the detecting signal voltage rise—that is, at the same voltage—as trigger pair $TP_2$.

The gate circuit 22 for controlling the flow of pulses from pulse generator 24 to counter 26 comprises three input rectifiers 50, 52 and 54 having a common connection from which the output to counter 26 is taken, said common connection being grounded through a resistor 56. The input rectifiers 50, 52 and 54 all have their easy conducting directions away from their common connection. Trigger pairs $TP_1$ and $TP_2$ are each connected to one of said rectifiers, trigger pair $TP_1$ to rectifier 52 and trigger pair $TP_2$ to rectifier 50, while pulse generator 24 is connected to rectifier 56. With such an arrangement, a voltage will appear at the output only when a voltage is applied simultaneously to each of rectifiers 50, 52 and 54, as when both trigger pair output voltages are high and when a voltage, corresponding to the pulse from pulse generator 24, is applied to rectifier 56. Thus, gate output pulses corresponding to the pulse generator pulses will be provided when the output voltage of both trigger pairs is high, the pulses in effect being gated by the voltages at rectifiers 50 and 52 provided by trigger pairs $TP_1$ and $TP_2$.

In operation, then, if a sine wave comparison voltage is applied to one terminal 9 of first detector $D_1$, and an unknown voltage to the other terminal 11—the voltages in effect opposing, the detecting signal—provided by pulse generator 14—will have a voltage rise peak at a point at which the instantaneous amplitude of the sine wave, provided by wave generator 16, is equal to the value of the unknown voltage, the voltages then being equal and opposite to give a zero voltage across detector elements 10. The detecting signal voltage, amplified by amplifier 18, is used to trigger the first trigger pair $TP_1$ to provide a voltage change at a time $T_1$.

The same sine wave comparison voltage supplied by wave generator 16, together with the alternating detecting signal supplied by pulse generator 14, is simultaneously applied to one terminal 13 of second voltage sensitive detector $D_2$, to the other terminal 15 of which is applied a zero voltage. There will thus appear a detecting signal peak at the time the instantaneous sine wave voltage is equal to the reference voltage, and such peak is amplified by amplifier 18 and fed to the second trigger pair $TP_2$, producing a voltage change at a time $T_2$. The time $T_2$ will always be at the same point in the sine wave cycle since the same sine wave comparison voltage and zero voltage are always applied to the terminals of detector $D_2$, and, since the same sine wave reference voltage is applied to both detectors $D_1$ and $D_2$, the time $T_2$ will thus provide an accurate reference point in the sine wave cycle from which to measure the time $T_1$. The trigger pairs $TP_1$ and $TP_2$ will both be reset to their initial condition at time $T_3$ by wave generator 16 in readiness for a new cycle. The difference between times $T_1$ and $T_2$ determines the amplitude of the unknown voltage if the reference voltage is zero, since the shape, amplitude and frequency of the sine wave produced by the wave generator 16 is accurately known and from such data the amplitude of the sine wave at any point in its cycle may be determined. A known voltage, as from a standard cell, may be used for calibration purposes to replace the unknown voltage at terminals 21 and 23.

The voltage changes thus produced at time $T_1$ and $T_2$ provide a digitalized voltage reading by applying such voltage changes to gate 22. Pulses are produced by pulse generator 22 at a predetermined frequency such as 50 kilocycles per second and, since the gate 22 will operate for an interval of time determined by the trigger pair voltage changes at times $T_1$ and $T_2$, a number of pulses representing the digitalized unknown voltage will in effect pass through the gate 22. The pulses thus passing through the gate may be recorded or used to operate computing mechanisms, for instance, they may be counted by a counter 26 and the information represented by the counted pulses fed to a computing mechanism in the well known manner.

Figure 2:
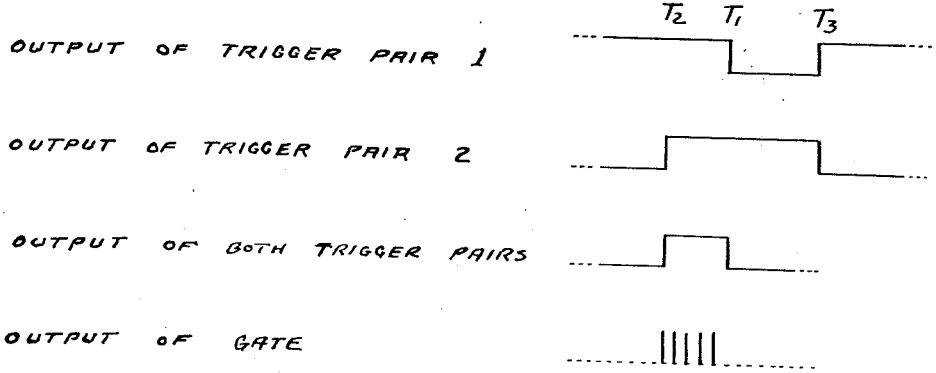
Fig. 2 is a series of illustrations of voltage conditions taken at various points in Fig. 1.

In Fig. 2 is illustrated voltage conditions taken at various points in the circuit of my novel digital voltmeter. It will be seen that prior to the time $T_2$, the voltages supplied to gate 22 by trigger pair $TP_2$ is low and thus the gate will not operate to pass pulses to counter 26. Between times $T_2$ and $T_1$, the voltages supplied to gate 22 by both trigger pairs $TP_1$ and $TP_2$ will be high, and gate 22 will operate to pass pulses to counter 26. After time $T_1$, the voltage supplied by trigger pair $TP_1$, will drop, cutting off the gate. At time $T_3$, both trigger pairs will be reset to their initial condition. Thus, the high voltage necessary to make gate 22 operative is only provided when each of the trigger pairs is providing a high voltage, and during such time the gate 22 will pass pulses, providing at its output the number of pulses generated by pulse generator 24 within the time $T_1T_2$.

The maximum speed of reading of my novel digital voltmeter is determined by the frequency of the wave generator, 60 cycles per second being entirely suitable for most purposes though any other frequency can be used if desirable. For a given reading frequency, the accuracy of my digital voltmeter is determined by the pulse frequencies supplied by pulse generators 14, a frequency of the order of 10 times higher than that of the wave generator being suitable for accuracy to five digits. For example, a 50 kilocycle pulse generator is suitable for use with a 60 cycle wave generator. The pulse generators 14 and 24 may have the same frequency, and in such case but a single pulse generator is necessary.

It will thus be seen that I have provided a novel voltmeter adapted to digitalize an unknown voltage reading so that it may be fed directly to a recording device or computing mechanism without the intervention of an operator, as well as a novel voltage detector adapted to compare an unknown voltage with a series of known voltages. It will be apparent to those skilled in the art that various modifications, other than those herein set forth, may be made within the spirit of my invention and the scope of the appended claims.

I claim:

1. A digital voltmeter including a first voltage sensitive two terminal detector, means for supplying an unknown voltage to one terminal of said first detector, a second voltage sensitive two terminal detector, means for supplying a reference voltage to one terminal of said second detector, detecting signal generator means operatively connected to each of said detectors, as a load for providing a pulsating detecting signal to said detectors, comparison voltage generator means for providing a comparison voltage to the other terminal of each of said detectors, and means operatively connected to both of said detectors responsive to the time interval between the amplitude peaks of detecting signal voltage appearing across said detectors.

2. A digital voltmeter including a first voltage sensitive two terminal detector, means for supplying an unknown voltage to one terminal of said first detector, a second voltage sensitive two terminal detector, means for supplying a reference voltage to one terminal of said second detector, detecting signal generator means operatively connected to each of said detectors as a load for providing a pulsating detecting signal to said detectors, comparison voltage generator means for providing a comparison voltage to the other terminal of each of said detectors, a first trigger means connected to said first detector responsive to the amplitude of said detecting signal appearing across said first detector to produce a first voltage change, second trigger means connected to said second detector responsive to the amplitude of said detecting signal appearing across said second detector to produce a second voltage change, and means actuated by both of said trigger means responsive to the time interval between said first and said second voltage changes to indicate said time interval, said time interval being determined by said unknown voltage.

3. A digital voltmeter including a first voltage sensitive two terminal detector, means for supplying an unknown voltage to one terminal of said first detector, a second voltage sensitive two terminal detector, means for supplying a reference voltage to one terminal of said second detector, detecting signal generator means operatively connected to each of said detectors as a load for providing a pulsating detecting signal to said detectors, comparison voltage geenrator means for providing a comparison voltage to the other terminal of each of said detectors, a first trigger means connected to said first detector responsive to the amplitude of said detecting signal appearing across said first detector to produce a first voltage change, second trigger means connected to said second detector responsive to the amplitude of said detecting signal appearing across said second detector to produce a second voltage change, and means actuated by both of said trigger means responsive to the time interval between said first and second voltage changes, including pulse generator means arranged to provide pulses at predetermined intervals and counter means arranged to count said pulses and digitalize said unknown voltage, the total number of said pulses being determined by the time interval between said first and second detector pulses.

References Cited in the file of this patent

UNITED STATES PATENTS

| | | |
|---|---|---|
| 2,407,320 | Miller | Sept. 10, 1946 |
| 2,453,454 | Norwine | Nov. 9, 1948 |
| 2,471,168 | Posthumus | May 24, 1949 |
| 2,486,390 | Cummingham | Nov. 1, 1949 |
| 2,599,675 | Volz | June 10, 1952 |
| 2,601,491 | Baker | June 24, 1952 |
| 2,652,194 | Hirsch | Sept. 15, 1953 |

OTHER REFERENCES

Electrical Engineering; "The Binary Quantizer," by Barney, November 1949, pages 962–966.